US012468468B2

(12) United States Patent
Subramanian et al.

(10) Patent No.: US 12,468,468 B2
(45) Date of Patent: Nov. 11, 2025

(54) COMPOSITE AGGREGATE ARCHITECTURE

(71) Applicant: NetApp Inc., San Jose, CA (US)

(72) Inventors: Ananthan Subramanian, San Ramon, CA (US); Sriram Venketaraman, Bangalore (IN); Ravikanth Dronamraju, Pleasanton, CA (US); Mohit Gupta, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/419,276

(22) Filed: Jan. 22, 2024

(65) Prior Publication Data
US 2024/0184470 A1 Jun. 6, 2024

Related U.S. Application Data

(63) Continuation of application No. 17/536,249, filed on Nov. 29, 2021, now Pat. No. 11,880,578, which is a
(Continued)

(51) Int. Cl.
*G06F 3/06* (2006.01)
*G06F 12/02* (2006.01)
(Continued)

(52) U.S. Cl.
CPC ............ *G06F 3/0643* (2013.01); *G06F 3/061* (2013.01); *G06F 3/0653* (2013.01); *G06F 3/067* (2013.01);
(Continued)

(58) Field of Classification Search
None
See application file for complete search history.

(56) References Cited

U.S. PATENT DOCUMENTS 7,650,460 B2   1/2010  Cheriton
7,653,797 B1   1/2010  Phillips et al.
(Continued)

FOREIGN PATENT DOCUMENTS

CN   101529433 A   9/2009
JP   2014038463 A   2/2014
(Continued)

OTHER PUBLICATIONS

Chinese office action cited in corresponding application No. CN2018800301842, mailed on Nov. 23, 2022, 2 pages.
(Continued)

*Primary Examiner* — Yaima Rigol
(74) *Attorney, Agent, or Firm* — Cooper Legal Group LLC

(57) ABSTRACT

Techniques are provided for providing a storage abstraction layer for a composite aggregate architecture. A storage abstraction layer is utilized as an indirection layer between a file system and a storage environment. The storage abstraction layer obtains characteristic of a plurality of storage providers that provide access to heterogeneous types of storage of the storage environment (e.g., solid state storage, high availability storage, object storage, hard disk drive storage, etc.). The storage abstraction layer generates storage bins to manage storage of each storage provider. The storage abstraction layer generates a storage aggregate from the heterogeneous types of storage as a single storage container. The storage aggregate is exposed to the file system as the single storage container that abstracts away from the file system the management and physical storage details of data of the storage aggregate.

20 Claims, 10 Drawing Sheets

Related U.S. Application Data continuation of application No. 16/690,887, filed on Nov. 21, 2019, now Pat. No. 11,188,246, which is a continuation of application No. 15/467,293, filed on Mar. 23, 2017, now Pat. No. 10,521,143.

(51) Int. Cl.
*G06F 12/14* (2006.01)
*G06F 16/14* (2019.01)

(52) U.S. Cl.
CPC .......... *G06F 3/0683* (2013.01); *G06F 3/0685* (2013.01); *G06F 12/0253* (2013.01); *G06F 12/1408* (2013.01); *G06F 16/148* (2019.01); *G06F 2212/402* (2013.01)

(56) References Cited

U.S. PATENT DOCUMENTS

| | | | |
|---|---|---|---|
| 8,291,185 | B2 | 10/2012 | Na et al. |
| 8,412,685 | B2 | 4/2013 | Tee et al. |
| 8,443,153 | B1 | 5/2013 | Edwards et al. |
| 8,463,825 | B1 | 6/2013 | Harty et al. |
| 8,539,008 | B2 | 9/2013 | Faith et al. |
| 8,621,161 | B1 | 12/2013 | Briggs |
| 8,732,426 | B2 | 5/2014 | Colgrove et al. |
| 8,751,725 | B1 | 6/2014 | Gangadharan et al. |
| 8,782,344 | B2 | 7/2014 | Talagala et al. |
| 8,918,378 | B1 | 12/2014 | Faith et al. |
| 8,959,263 | B2 | 2/2015 | Sokol, Jr. et al. |
| 9,043,530 | B1 | 5/2015 | Sundaram et al. |
| 9,116,858 | B1 | 8/2015 | Yokoi et al. |
| 9,116,914 | B1* | 8/2015 | Muthirisavenugopal ................. G06F 16/188 |
| 9,189,421 | B2 | 11/2015 | Testardi et al. |
| 9,329,789 | B1 | 5/2016 | Chu et al. |
| 9,588,977 | B1 | 3/2017 | Wang et al. |
| 9,818,378 | B2 | 11/2017 | Iida |
| 10,521,124 | B1 | 12/2019 | Aharoni et al. |
| 10,521,143 | B2 | 12/2019 | Subramanian et al. |
| 11,188,246 | B2 | 11/2021 | Subramanian et al. |
| 11,880,578 | B2 | 1/2024 | Subramanian et al. |
| 2005/0268062 | A1 | 12/2005 | Nagase et al. |
| 2008/0082835 | A1 | 4/2008 | Asher et al. |
| 2008/0222346 | A1 | 9/2008 | Raciborski et al. |
| 2010/0115185 | A1 | 5/2010 | Ono et al. |
| 2010/0235592 | A1* | 9/2010 | Kaneda ................. G06F 3/0607 711/E12.001 |
| 2010/0281230 | A1* | 11/2010 | Rabii .................... G06F 3/0605 711/170 |
| 2011/0202705 | A1 | 8/2011 | Hayashi et al. |
| 2013/0054927 | A1 | 2/2013 | Raj et al. |
| 2014/0201168 | A1 | 7/2014 | Periyagaram et al. |
| 2015/0269032 | A1 | 9/2015 | Muthyala et al. |
| 2016/0092141 | A1 | 3/2016 | Araki et al. |
| 2016/0132433 | A1* | 5/2016 | Hayashi .................. G06F 3/067 711/118 |
| 2016/0147443 | A1 | 5/2016 | Van Riel et al. |
| 2016/0162366 | A1* | 6/2016 | Oberhofer ............... G06F 16/17 707/645 |
| 2016/0292178 | A1 | 10/2016 | Manville et al. |
| 2016/0335158 | A1 | 11/2016 | De Schrijver et al. |
| 2017/0069132 | A1* | 3/2017 | Howson ................ G06T 15/005 |
| 2017/0371781 | A1 | 12/2017 | Choi |
| 2018/0025022 | A1* | 1/2018 | Van Riel ............... G06F 12/109 707/620 |
| 2018/0183868 | A1 | 6/2018 | Kusters et al. |

FOREIGN PATENT DOCUMENTS

| | | |
|---|---|---|
| JP | 2014517952 A | 7/2014 |
| JP | 2016506578 A | 3/2016 |
| JP | 2016506579 A | 3/2016 |

OTHER PUBLICATIONS

EP Communication cited in EP Application No. EP18715172 dated Oct. 11, 2021, 9 pages.
European Office Action for Application No. EP18715172 dated Jan. 3, 2024, 6 pages.
Final Office Action mailed Jun. 14, 2023 for U.S. Appl. No. 17/536,249, filed Nov. 29, 2021, 31 pages.
International Search Report and Written Opinion for PCT Application No. PCT/US2018/022140 mailed Jun. 22, 2018, 13 pages.
Japanese Notice of Allowance Cited in Japanese Application No. 2019552178 dated Apr. 21, 2021, 5 pages.
Japanese Office Action Cited in Japanese Application No. 2019522178 dated Jan. 26, 2021, 7 pages.
Japanese Search Report Cited in Japanese Application No. 2019552178 dated Dec. 21, 2020, 24 pages.
Mamada D., et al., "Data Move Algorithm for Long-life Flash SSD," IEICE Technical Report, The Institute of Electronics, Information and Communication Engineers (IEICE), 2011, vol. 111(252), 3 pages.
Notice of Allowance mailed on Sep. 19, 2023 for U.S. Appl. No. 17/536,249, filed Nov. 29, 2021, 09 pages.

* cited by examiner

COMPOSITE AGGREGATE ARCHITECTURE

RELATED APPLICATIONS

This application claims priority to and is a continuation of U.S. application Ser. No. 17/536,249, filed on Nov. 29, 2021, now allowed, titled "COMPOSITE AGGREGATE ARCHITECTURE," which claims priority to and is a continuation of U.S. Pat. No. 11,188,246, filed on Nov. 21, 2019, titled "COMPOSITE AGGREGATE ARCHITECTURE," which claims priority to and is a continuation of U.S. Pat. No. 10,521,143, filed on Mar. 23, 2017 and titled "COMPOSITE AGGREGATE ARCHITECTURE," which are incorporated herein by reference.

BACKGROUND

Many storage systems may provide clients with access to data stored within a plurality of storage devices. For example, a storage controller may store client data within a set of storage devices that are locally accessible (e.g., locally attached to the storage controller) or remotely accessible (e.g., accessible over a network). A storage aggregate of storage may be generated from the set of storage devices (e.g., the storage aggregate may be stored across multiple storage devices). The storage aggregate may be exported from a storage file system to a client. The storage aggregate may appear as a single storage container to the client, such as a volume or logical unit number (lun). In this way, the aggregate abstracts away the details, from the client, of how the aggregate is physically stored amongst the set of storage devices.

Some storage systems may store data within a multi-tiered storage arrangement. For example, the storage controller may store data within a hard disk drive tier and a solid state storage tier. The hard disk drive tier may be used as a capacity tier to store client data and for processing input/output operations. The solid state storage tier may be used as a cache for accelerating the processing of storage operations. Unfortunately, different classes of storage devices and media have different characteristics and behaviors (e.g., latency, size, garbage collection, efficiency of random storage operations, efficiency of sequential storage operations, I/O access sizes such as a 4 kilobyte I/O access size, etc.). Thus, a storage file system is unable to natively create an aggregate from multiple heterogeneous storage devices and media.

DETAILED DESCRIPTION

Figure 1:
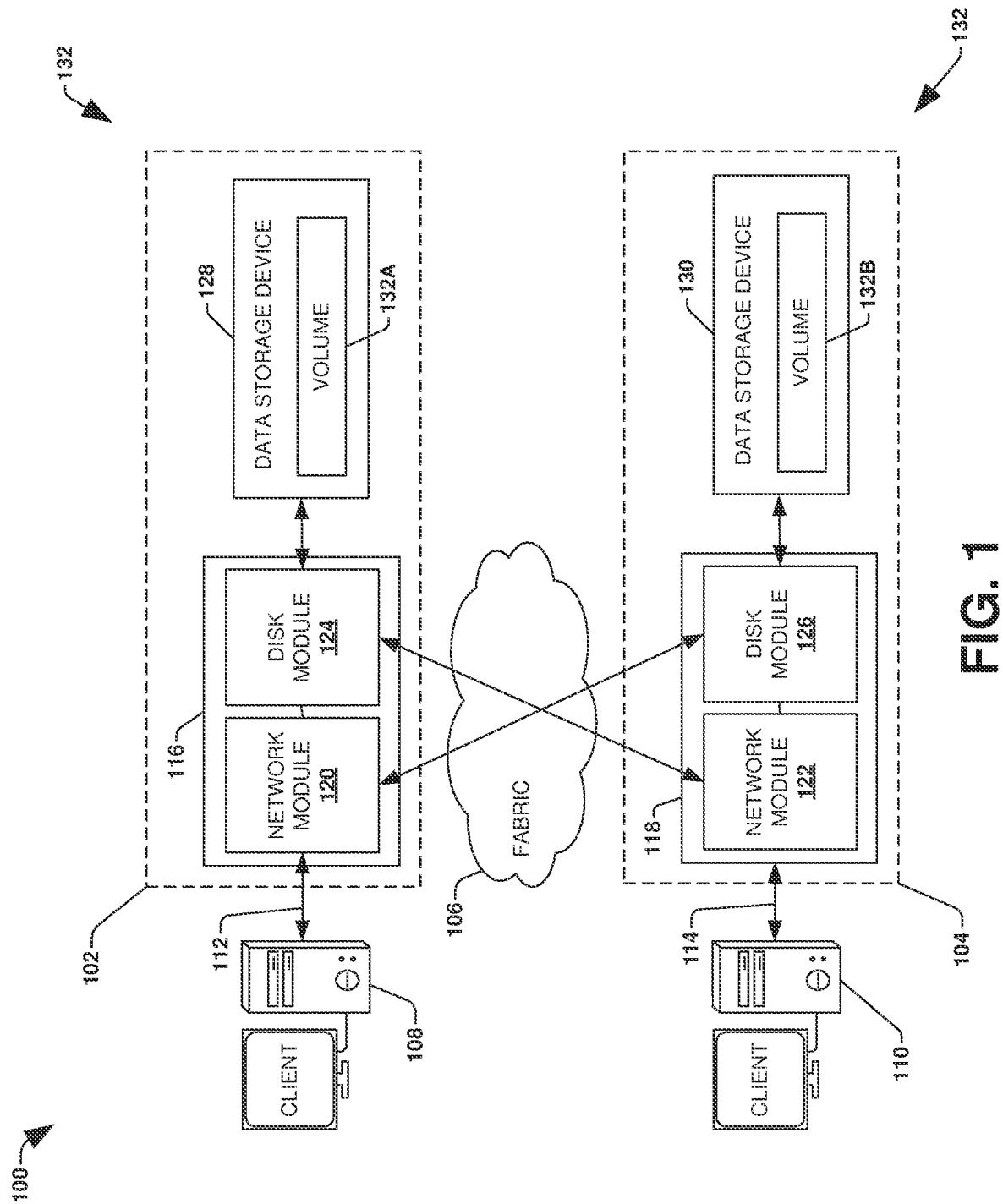
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for providing a storage abstraction layer for a composite aggregate architecture are provided herein. The storage abstraction layer is provided as an indirection layer between a file system and a storage environment having a plurality of heterogeneous types of storage and storage providers (e.g., the storage abstraction layer reside below a file system layer). For example, the storage abstraction layer is configured to obtain characteristics of storage providers of the storage environment, such as of a hard disk drive tier storage provider, a solid state drive tier storage provider, an object storage provider (e.g., a third party cloud storage provider), a high availability (HA) storage provider (e.g., an HA pair of nodes), a shingled magnetic recording (SMR) storage provider, etc. Because the storage abstraction layer is below the file system layer, the storage abstraction layer is capable of perform operations that the file system layer is incapable of performing. For example, the storage abstraction layer can generate a storage aggregate from heterogeneous types of storage provided by different storage providers (e.g., an aggregate from storage of different classes of storage and media with different characteristics and behavior). The storage aggregate is exposed to the file system as though it is a single data container from homogeneous storage. The storage abstraction layer can determine where to store data (e.g., select a particular storage provider to store certain data), when and how to move data between different storage providers, how to perform garbage collection on an individual storage provider basis (e.g., freeing of storage blocks can be done separately and per storage provider/device as opposed to by the file system), and preserve storage efficiency of the file system such as deduplication, encryption, and compression.

The storage abstraction layer can span any number of nodes, and a file system can reside on number of the nodes.

New storage providers and/or storage devices can be dynamically integrated with the storage abstraction layer, such as without the knowledge of or understanding by the file system. Thus, new storage providers and/or storage devices that are not natively compatible with the file system (e.g., the file system performs I/O access on 4 kilobyte chunks, whereas it is more efficient to send data to a distributed storage provider, such as a cloud provider, in larger chunks such as in megabyte or gigabyte chunks for network and processing efficiency) can still be used for the storage aggregate because the storage abstraction layer handles how and where to store data.

To provide for providing a storage abstraction layer for a composite aggregate architecture, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that providing a storage abstraction layer for a composite aggregate architecture may be implemented within the clustered network environment 100. In an example, a storage abstraction layer may generate and maintain a first storage bin to manage the data storage device 128 of the node 116 (e.g., a first storage provider) and a second storage bin to manage the data storage device 130 of the node 118 (e.g., a second storage provider). The storage abstraction layer may be an indirection layer underneath a storage file system layer. The storage abstraction layer generates and exposes a single storage aggregate, derived from the data storage device 128 and the data storage device 130, to a file system notwithstanding the data storage devices 128, 130 being heterogeneous types of storage. It may be appreciated that providing a storage abstraction layer for a composite aggregate architecture may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
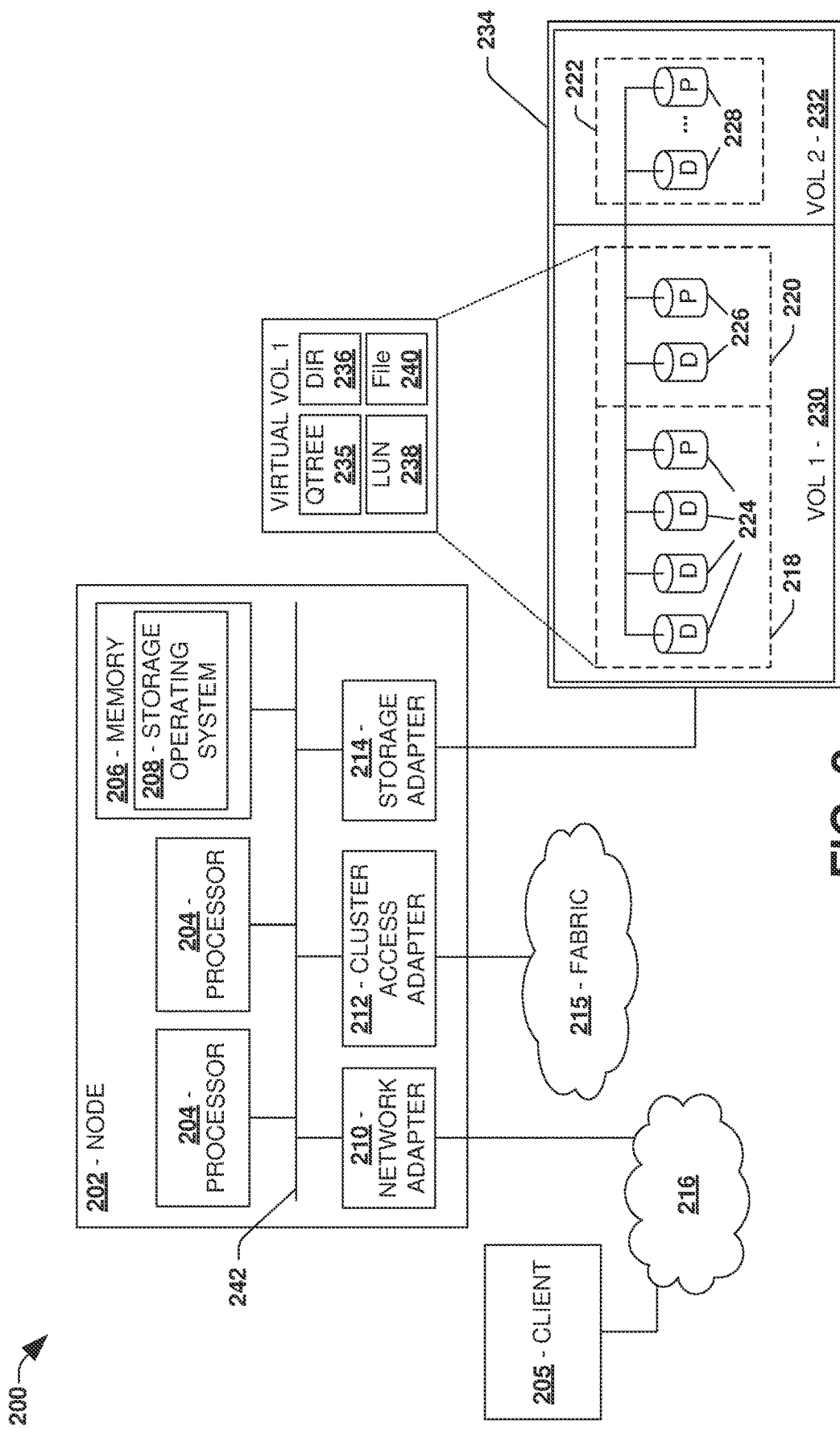
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that providing a storage abstraction layer for a composite aggregate architecture may be implemented for the data storage system 200. In an example, a storage abstraction layer may generate and maintain a first storage bin to manage storage of the node 202 (e.g., a first storage provider). The storage abstraction layer may maintain other storage bins for managing storage (e.g., storage devices with different characteristics than the storage of the node 202) of other nodes. In this way, the storage abstraction layer generates and exposes a single storage aggregate, derived from storage of the node 202 and/or storage other storage providers, to a file system. It may be appreciated that providing a storage abstraction layer for a composite aggregate architecture may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
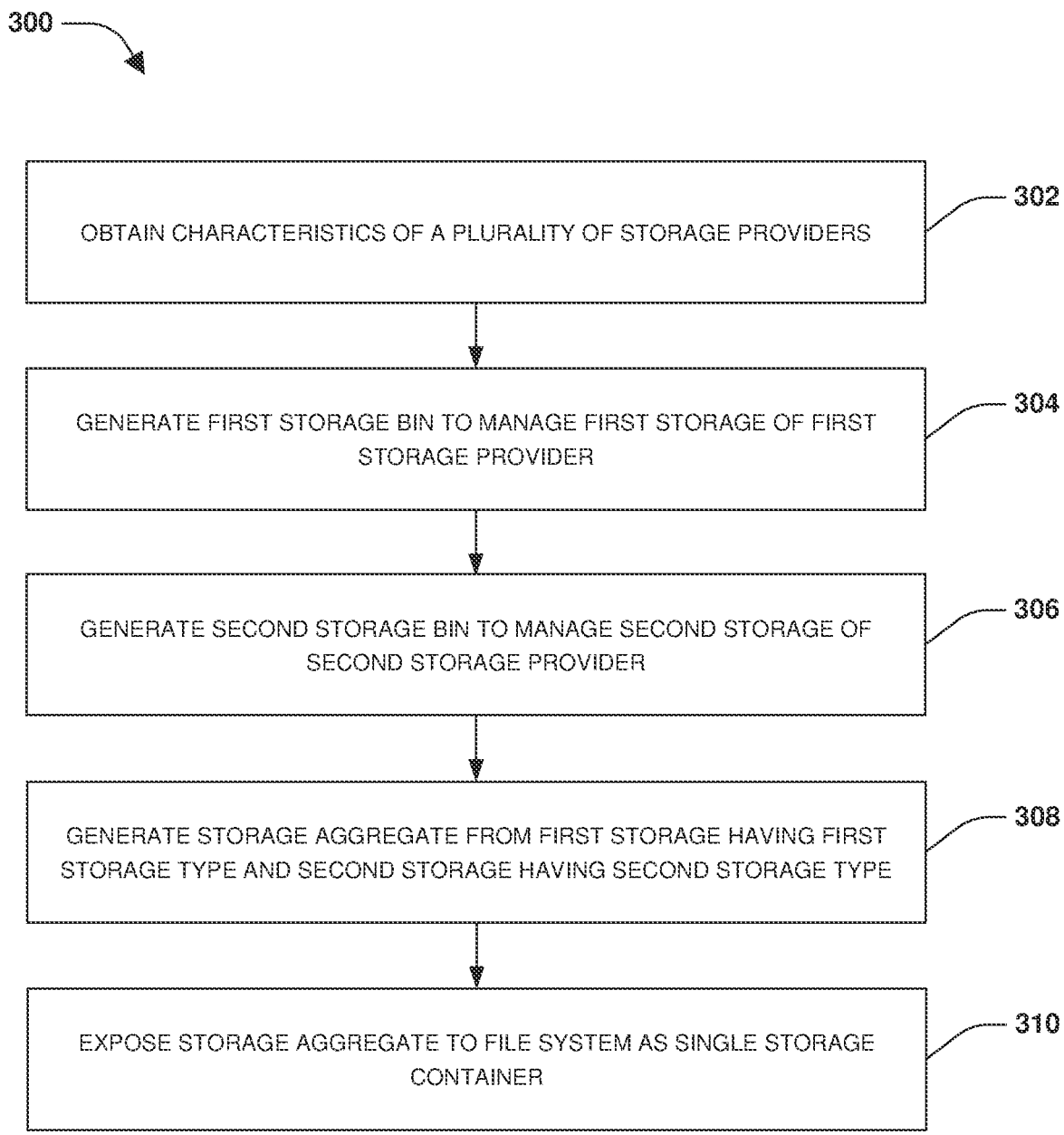
FIG. 3 is a flow chart illustrating an exemplary method of providing a storage abstraction layer for a composite aggregate architecture.

One embodiment of providing a storage abstraction layer for a composite aggregate architecture is illustrated by an exemplary method 300 of FIG. 3. A storage abstraction layer (e.g., a set of classes, functionality, protocol functionality, policies, network communication functionality, storage management functionality, etc. that can provide a transparent interface to various storage providers) can be utilized as an indirection layer between a file system (e.g., a storage file system) and a storage environment (e.g., storage providers accessible over one or more networks). The storage abstraction layer can abstract away the details regarding where and how data is stored amongst a plurality of different types of storage providers and storage devices. For example, the storage abstraction layer may expose a storage aggregate/pool that appears to be a single storage container to the file system. Thus, the file system merely reads and writes to that single storage container. However, the storage abstraction layer intercepts the read and write requests, and determines where and how to store and retrieve data.

At 302, the storage abstraction layer obtains characteristics of a plurality of storage providers that provide access to heterogeneous types of storage of the storage environment. The characteristics may relate to latency, storage capacity, type of storage device/media (e.g., magnetic storage, solid state/flash storage, cloud storage, high availability storage, memory or NVRAM, locally attached storage, remote storage, shingled magnetic recording storage, etc.), I/O access size, garbage collection policies, supported storage access protocols, encryption used, how data is stored (e.g., stored as blocks of data having a particular size), how data is referenced/indexed (e.g., referenced by an object ID and an offset within the object ID for particular data, referenced by a physical block number, referenced by a logical block number, referenced by a file name, referenced by an offset, etc.), etc.

In an example, the storage abstraction layer may communicate with a first node and a second node (e.g., a high availability node pairing) that provide high availability access to locally attached data storage in order to obtain characteristics of the nodes and their storage. In another example, the storage abstraction layer may communicate, over a network, to a distributed object storage provider (e.g., cloud storage provided by a third party provider) that provides object storage in order to obtain characteristics of the distributed storage provider and the object storage. In this way, a variety of storage providers may be accessed in order to obtain the characteristics. Because the storage abstraction layer can interface with multiple different types of storage providers, the file system can be hosted across any number of nodes and the storage abstraction layer can create aggregates from storage hosted by multiple different types of nodes and storage providers.

At 304, a first storage bin may be generated, by the storage abstraction layer, to manage first storage of a first storage provider. The first storage bin may be configured based upon first characteristics of the first storage provider. For example, the first storage bin may be configured to access the first storage provider (e.g., a solid state storage provider) using a particular protocol and I/O access size used by the first storage provider. The first storage bin may be configured to use certain types of compression, encryption, garbage collection policies, data formats, and/or data reference formats (e.g., refer to data by physical block numbers, logical block numbers, file names, object identifiers, offsets, etc.) associated with the first storage provider.

At 306, a second storage bin may be generated, by the storage abstraction layer, to manage second storage of a second storage provider. The second storage bin may be configured based upon second characteristics of the second storage provider. For example, the second storage bin may be configured to access the second storage provider (e.g., a cloud storage provider) using a protocol and/or I/O access size used by the second storage provider. The second storage bin may be configured to use certain types of compression, encryption, garbage collection policies, data formats, and/or data reference formats (e.g., refer to data by physical block numbers, logical block numbers, file names, object identifiers, offsets, etc.) associated with the second storage provider.

It may be appreciated that the storage abstraction layer may generate any number of storage bins for any number of storage providers for which the storage abstraction layer is to abstract away the details of physically storing data from the file system. The storage providers may store data in different manners and provide access to data in different ways. For example, the first storage provider may support a first I/O size such as a 4 kilobyte I/O size for reading/writing data. In contrast, the second storage provider may support a second I/O size such as an unconstrained range up to 1 gigabyte. For example, it may be more efficient to send data to the cloud storage provider in larger chunks such as chunks in a megabyte or gigabyte range, which may more efficiently utilize network bandwidth and processing resources. Even though the file system may merely support the first I/O size, the storage abstraction layer can use the second storage bin as an intermediary interface to handle the details of how data will be sent to, stored within, and accessed from the cloud storage provider using the second I/O size.

At 308, a storage aggregate is generated, by the storage abstraction layer, from the first storage having a first storage type (e.g., solid state drive storage provided by the first storage provider), the second storage having a second storage type different than the first storage type (e.g., object storage provided by the cloud storage provider), and/or other storage from other storage providers. The storage abstraction layer will use individual storage bins to manage where and how to store and access data within each storage of each storage provider. At 310, the storage aggregate is exposed to the file system as a single storage container. For example, the storage abstraction layer may expose the storage aggregate as a single volume, a single LUN, or other data container while abstracting away the notion that the storage aggregate is actually composed of portions of storage from multiple storage provider. In an example, the storage abstraction layer may expose merely a subset of characteristics of the storage providers to the file system (e.g., a type of storage may be exposed, but not other characteristics like how old/stale data blocks are freed, overwritten, etc.).

The storage abstraction layer is utilized to selectively store a plurality of data from the file system through storage bins to corresponding storage of the plurality of storage providers based upon characteristics of data and characteristics of storage providers. A characteristic may corresponding to a sequential access characteristic, a random access characteristic, a user data characteristic, a metadata characteristic (e.g., a replication policy, a backup policy, a LUN configuration, an identification of a partner node, and/or other metadata used by the file system or nodes for operation), a frequently accessed characteristic (e.g., hot data having an access frequency/pattern above a threshold), an infrequently accessed characteristic (e.g., cold data having an access frequency/pattern below the threshold), etc. The storage abstraction layer is configured to determine which type of storage and storage provider is better suited to store certain types of data (e.g., a cloud storage provider may be more cost effective to store infrequently accessed user data, whereas a shingled magnetic recording storage provider may be better for frequently accessed metadata and a high availability storage provider with additional redundancy may be better for mission critical data).

In an example, a request may be received from the file system to store first data within the storage aggregate. Because the storage aggregate is exposed as a single storage container, the request does not specify which storage provider and/or type of storage the first data is to be stored. Accordingly, the storage abstraction layer may selectively store the first data, through the first storage bin, into a first storage location of the first storage and not into the second storage based upon a data characteristic of the first data corresponding to a characteristic of the first storage provider (e.g., the first storage may be more efficient for storing sequentially accessed data than the second storage). At some point in time, the storage abstraction layer may determine that the first data should be moved from the first storage location within the first storage to a second storage location within the second storage of the second storage provider. Accordingly, the storage abstraction layer moves the first data from the first storage to the second storage at the second storage location, which may be performed transparent to the file system since the storage abstraction layer abstracts away the physical storage details of data of the storage aggregate from the file system.

An overwrite request, to overwrite the first data with new data, may be received by the storage abstraction layer from the file system. In an example where the file system is a write anywhere file system, the new data may not be written to a current location of the first data (e.g., the second storage location of the second storage) but is written to a different location that is free/available. Thus, at some point, the first data at that current location will need to be garbage collected so that the current location is freed and available to store other data since the first data at the second storage location has become stale once the new data is written to the different location. The storage abstraction layer may store the new data of the overwrite request into a third storage location as new first data. The third storage location may be within the first storage where the first data was previously located before being moved/migrated, or within the second storage where the first data is currently located at the second storage location, or within any other storage of any other storage provider. The second storage bin may be used to mark the first data at the second storage location for garbage collection so that the second storage location can be freed and available for data storage since the new first data at the third storage location is a most up-to-date version. Garbage collection may be facilitated on a storage provider by storage provider basis in a manner that is transparent to the file system (e.g., different garbage collection policies may be implemented for different storage providers).

In an example, the storage abstraction layer may track various metrics regarding data, such as a first frequency of access to data (A) within the first storage, a second frequency of access to data (B) within the second storage, etc. Responsive to the storage abstraction layer determining that the first frequency of access is below a threshold set by the first storage bin for the first storage, the data (A) may be accumulated from the first storage into a log of the first storage bin. Responsive to the storage abstraction layer determining that the second frequency of access is below a threshold set by the second storage bin for the second storage, the data (B) may be accumulated from the second storage into a second log of the second storage bin.

The storage abstraction layer may determine that a threshold amount of data has been accumulated into the log of the first storage bin for the first storage (e.g., a threshold amount of cold data may be collected from the solid state drive storage of the solid state drive storage provider into the first storage bin). Accordingly, the storage abstraction layer may generate a storage object, corresponding to a data format of the second storage (e.g., the cloud storage provider may store data within objects), comprising the accumulated data from the log such as the data (A). In this way, the storage object may comprise data of various files, directories, applications, etc. The storage abstraction layer sends the storage object, through the second storage bin, to the second storage provider for storage within the second storage. It may be appreciated that accumulated data from any type of storage provider may be used to generate any type of data object/container that is compatible with a destination for the accumulated data (e.g., a block based data format, a file, a LUN, a storage object, a database file, etc.). The storage abstraction layer may populate an object metafile with one or more entries indication what data is stored within the storage object (e.g., data references used by the file system to reference the data such as virtual block numbers), and object identifier of the storage object, and offsets of such data.

The storage abstraction layer may receive an access request for the data (A) from the file system (e.g., the file system may be unaware of the location of the data (A) as being within the storage object now stored at the second storage of the second storage provider). In an example, the access request comprises a physical volume block number or any other identifier used by the file system to reference the data (A) within the storage aggregate. The storage abstraction layer may query the object metafile using the physical volume block number to identify an object identifier of the storage object and an offset of the data (A) within the storage object. The object identifier and the offset may be used to provide access through the second storage bin to the data (A)

within the storage object stored within the second storage by the second storage provider. In this way, the file system may access the data (A) notwithstanding the data (A) being comprised within the storage object, along with other data that may be unrelated, that is now stored within the second storage.

The storage abstraction layer may track reference counts of references to data stored within the storage of the storage providers (e.g., the storage abstraction layer may provide its own garbage collection for individual storage of each storage provider as opposed to adhering to what is tracked by the file system for the storage aggregate). For example, the first storage bin may be used to track reference counts of references to data within the first storage. The reference counts may be used to free data, with reference counts of zero, from the first storage because such data may be stale/unused due to new data being written elsewhere by a write anywhere file system that does not overwrite current locations of data with new data but writes the new data to open/free storage locations.

The storage abstraction layer may be configured to preserve storage efficiency of the file system. In an example, the storage abstraction layer may receive compressed data from the file system. The storage abstraction layer may store the compressed data, in a compressed state, within the first storage. Alternatively, uncompressed data that is to be compressed may be received from the file system or retrieved from a storage provider. Accordingly, the storage abstraction layer may perform compression upon the uncompressed data (e.g., within a storage bin or log), and then send the compressed data to a particular storage provider.

In another example, the storage abstraction layer may receive encrypted data from the file system. The storage abstraction layer may store the encrypted data, in an encrypted state, within the first storage. Alternatively, unencrypted data that is to be encrypted may be received from the file system or retrieved from a storage provider. Accordingly, the storage abstraction layer may encrypted the unencrypted data (e.g., within a storage bin or log), and then send the encrypted data to a particular storage provider.

In another example, the storage abstraction layer may preserve deduplication provided by the file system. For example, the storage abstraction layer may maintain its own reference count of references to data.

In an example, if data is to be moved between storage providers, then the data may be placed into a log and then compression, encryption, and/or other storage efficiency functionality may be performed upon the data within the log in order to preserve such functionality.

Figure 4:
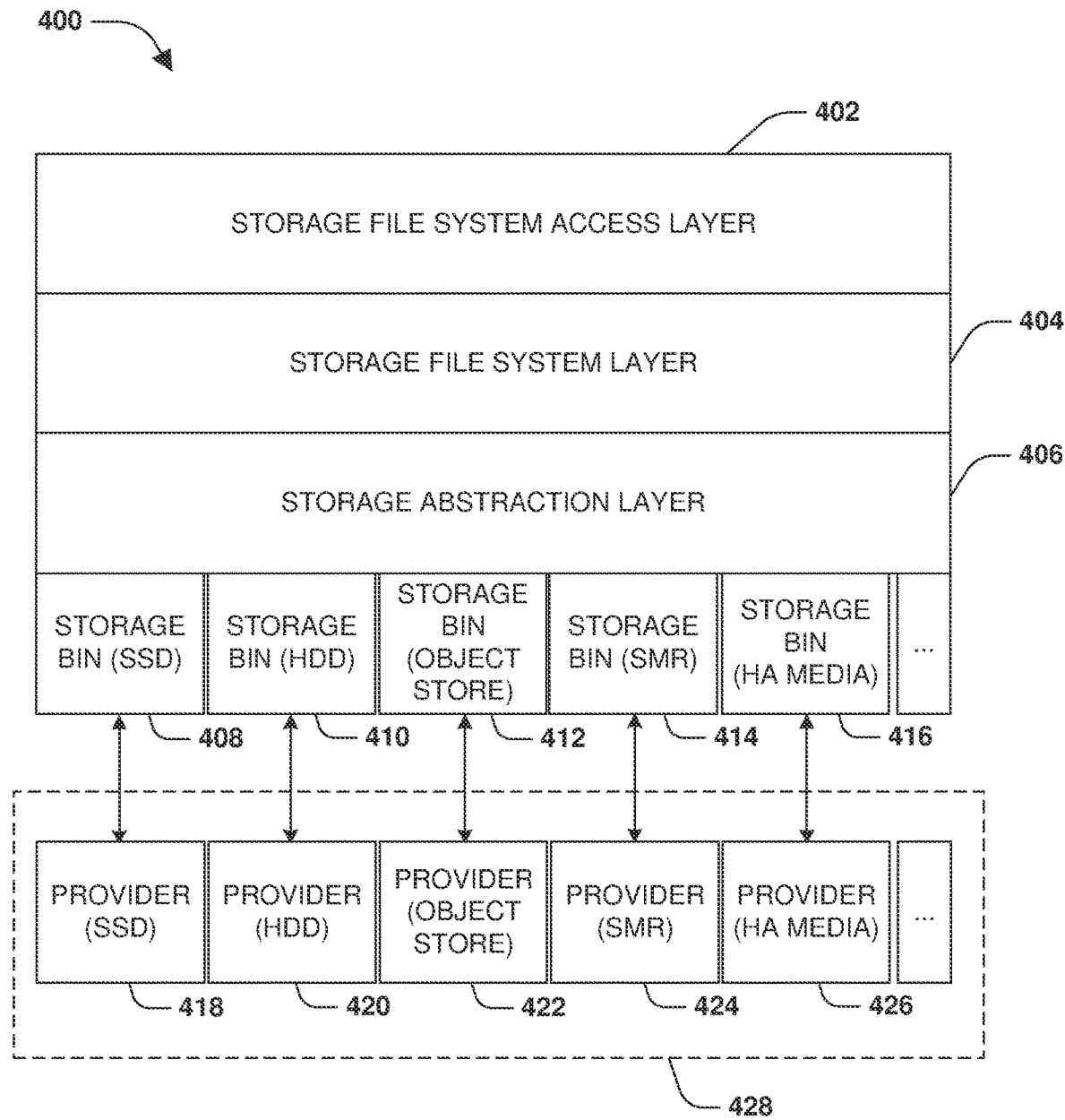
FIG. 4 is a component block diagram illustrating an exemplary computing device for providing a storage abstraction layer for a composite aggregate architecture.

FIG. 4 illustrates an example of a system 400 having a composite storage architecture. A file system may operate at a storage file system layer 404. Clients may access the file system through a storage file system access layer 402. For example, a client may send read commands, write commands, create commands, and/or other commands to the file system through the storage file system access layer 402. A storage abstraction layer 406 is provided as an indirection/intermediate layer between the file system, such as the storage file system layer 404, and a storage environment 428. The storage abstraction layer 406 is underneath the storage file system layer 404.

The storage abstraction layer 406 may obtain characteristics of storage providers within the storage environment 428. Based upon those characteristics, the storage abstraction layer 406 creates storage bins for managing storage of the storage providers. Each storage bin is tailored to a particular storage provider because types of storage provided by each storage provider may have different characteristics (e.g., certain storage may perform better for random access or sequential access; certain storage may provide better redundancy; certain storage providers may provide more security; certain storage providers may provide higher availability to data; etc.). For example, a solid state drive storage bin 408 may be generated for a solid state drive storage provider 418. The solid state drive storage bin 408 may determine where and how to store data within solid state drive storage of the solid state drive storage provider 418, set what protocols to use, set what garbage collection technique to use, set thresholds for determining cold/hot data for the solid state drive storage provider 418, set what compression to use, set redundancy polices, set security policies, set what I/O access size to use, set what data format to use, determine how to reference/identify particular data, etc.

A hard disk drive storage bin 410 may be generated for a hard disk drive storage provider 420. The hard disk drive storage bin 410 may determine where and how to store data within hard disk drive storage of the hard disk drive storage provider 420, set what protocols to use, set what garbage collection technique to use, set thresholds for determining cold/hot data for the hard disk drive storage provider 420, set what compression to use, set redundancy polices, set security policies, set what I/O access size to use, set what data format to use, determine how to reference/identify particular data, etc.

An object storage bin 412 may be generated for an object storage provider 422 (e.g., a cloud storage provider that stores data within objects). The object storage bin 412 may determine where and how to store data within object storage of the object storage provider 422, set what protocols to use, set what garbage collection technique to use, set thresholds for determining cold/hot data for the object storage provider 422, set what compression to use, set redundancy polices, set security policies, set what I/O access size to use, set what data format to use, determine how to reference/identify particular data, etc.

A shingled magnetic recording storage bin 414 may be generated for a shingled magnetic recording storage provider 424. The shingled magnetic recording storage bin 414 may determine where and how to store data within storage of the shingled magnetic recording storage provider 424, set what protocols to use, set what garbage collection technique to use, set thresholds for determining cold/hot data for the shingled magnetic recording storage provider 424, set what compression to use, set redundancy polices, set security policies, set what I/O access size to use, set what data format to use, determine how to reference/identify particular data, etc.

A high availability storage bin 416 may be generated for a high availability storage provider 426 (e.g., two nodes configured according to a high availability configuration). The high availability storage bin 416 may determine where and how to store data within storage of the high availability storage provider 426, set what protocols to use, set what garbage collection technique to use, set thresholds for determining cold/hot data for the high availability storage provider 426, set what compression to use, set redundancy polices, set security policies, set what I/O access size to use, set what data format to use, determine how to reference/identify particular data, etc.

In this way, the storage abstraction layer 406 can use the storage bins to individually manage different types of storage provided by the various storage providers. The storage abstraction layer 406 can generate a storage aggregate comprised of portions of storage from the various storage providers notwithstanding the storage providers hosting different types of storage, using different data formats, referencing data in different manners (e.g., physical block number, file name, offset, virtual block number, etc.) using different storage protocols, using different I/O access sizes, etc. The storage aggregate can be exposed up to the file system of the storage file system layer 404 as a single storage container. In this way, the storage abstraction layer 406 abstracts away the details of physically sending, storing, retrieving, and managing data across the storage providers (e.g., the file system may merely issue a write command to the storage aggregate, and the storage abstraction layer 406 may select a particular storage bin to use for selectively storing data of the write command to a particular storage provider).

Figure 5A:
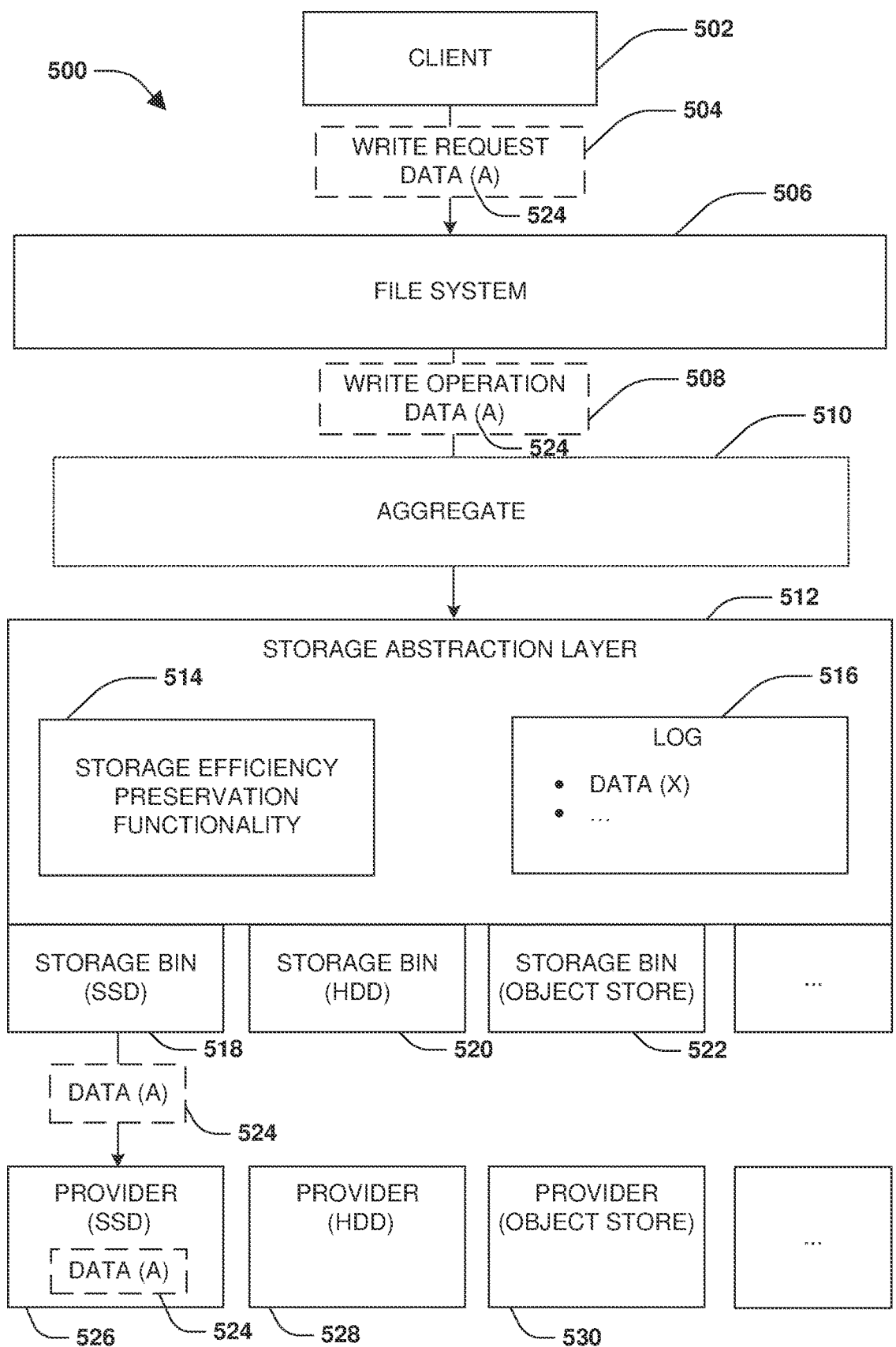
FIG. 5A is a component block diagram illustrating an exemplary computing device for providing a storage abstraction layer for a composite aggregate architecture, where data is selectively stored within storage of a particular storage provider.

FIGS. 5A-5E illustrate examples of a system 500 for providing a storage abstraction layer 512 for a composite aggregate architecture. The storage abstraction layer 512 may be provided as an indirection layer between a file system 506 and a storage environment, as illustrated by FIG. 5A. The storage environment may be defined as storage providers accessible to the storage abstraction layer 512, such as a solid state drive storage provider 526, a hard disk drive storage provider 528, an object storage provider 530 (e.g., a cloud storage provider hosted by a third party), and/or other local or remote storage providers.

The storage abstraction layer 512 may obtain characteristics of the storage providers, such as I/O access sizes, latencies, communication protocols, indications as to whether storage is more suitable for certain types of access (e.g., random access, sequential access, frequent access, infrequent access, etc.), how data is addressed/referenced, availability (e.g., whether failover operation is provided), redundancy, backup, garbage collection, etc.

The storage abstraction layer 512 may use the characteristics to generate storage bins (e.g., configured with functionality, methods, policies, classes, etc.) used to manage storage of the storage providers, such as a solid state drive storage bin 518, a hard disk drive storage bin 520, an object storage bin 522, etc. A storage bin may be configured to determine whether characteristics of data match characteristics of a corresponding storage provider, and thus are eligible to be stored within storage of the corresponding storage provider, otherwise, should be stored within storage of a different storage provider. The storage bin may be configured to determine where and how to store data within the storage of the corresponding storage provider. The storage bin may be configured with redundancy policy information, backup policy information, replication policy information, compression information, encryption information, deduplication information, garbage collection information, access metrics used to identify hot and cold data, what type of data is to be stored within the storage of the corresponding storage provider (e.g., user data, metadata, frequently accessed data, infrequently accessed data, sequential data, random data, encrypted data, compressed data, redundant or backup data, etc.), and/or other functionality and policies to implement for the storage of the corresponding storage provider. In this way, the storage abstraction layer 512 comprises storage efficiency preservation functionality 514, such as to preserve encryption, compression, deduplication, etc. of the file system 506.

The storage abstraction layer 512 may construct a storage aggregate 510 from solid state drive storage of the solid state drive storage provider 526, hard disk drive storage of the hard disk drive storage provider 528, object storage of the object storage provider 530, and/or other types of storage of other storage providers (e.g., shingled magnetic record storage, NVRAM, high availability storage providing by a high availability node pair, locally attached storage, remotely attached storage, storage accessing through a NAS protocol, storage accessing through a SAN protocol, etc.). In this way, the storage aggregate 510 is composed from heterogeneous types of storage, and is exposed to the file system 506 as a single data container where the storage abstraction layer 512 abstractions away the particulars of how and where data is stored and managed.

The file system 506 may provide a client 502 with access to the storage aggregate 510. Because the file system 506 views the storage aggregate as a single data container, the file system 506 may expose the storage aggregate 510 or a portion thereof to the client 502 as a single data container (e.g., a single volume, a single LUN, etc.). In an example, a first portion of the storage aggregate 510 may be exposed to the client 502, and a second portion of the storage aggregate 510 may be exposed to a different client, and thus the file system 506 provides a second level of indirection to the clients.

In an example, the file system 506 receives a write request 504 from the client 502 to write data (A) 524 to the storage aggregate 510 (e.g., a write request 504 directed by the client 502 to a volume or LUN exported from the storage aggregate 510 by the file system 506 to the client 502). The file system 506 may generate a write operation 508 to write the data (A) 524 to the storage aggregate 510. The storage abstraction layer 512 may intercept the write operation 508 and determine data characteristics of the data (A) 524 (e.g., is the data (A) 524 frequently accessed data, user data, metadata, random data, sequential data, etc.). The storage abstraction layer 512 may determine that the data characteristics of the data (A) 524 more closely match characteristics of the solid state drive storage provider 526. Accordingly, the solid state drive storage bin 518 may be used to determine where and how to storage the data (A) 524 within solid state drive storage of the solid state drive storage provider 526.

The storage abstraction layer 512, such as individual storage bins, may maintain a log 516 (e.g., or a log per storage bin) into which a particular type of data is accumulated so that accumulated data can be moved between storage of storage providers (e.g., cold data may be accumulated into a first log so that the cold data can be moved to a storage provider more suited for storing cold data; hot data may be accumulated into a second log so that the hot data can be moved to a storage provider more suited for storing hot data; sequentially accessed data may be accumulated into a third log so that the sequentially accessed data can be moved to a storage provider more suited for storing sequentially accessed data; randomly accessed data may be accumulated into a fourth log so that the randomly accessed data can be moved to a storage provider more suited for storing randomly accessed data; user data may be accumulated into a fifth log so that the user data can be moved to a storage provider more suited for user data; metadata may be accumulated into a sixth log so that the metadata can be moved to a storage provider more suited for metadata; etc.).

In an example, data (X) may be accumulated into the log 516 based upon a frequency of access to data (X) falling below a threshold set by a particular storage bin for a particular storage provider. For example, upon the storage bin determining that the data (X) is accessed below the threshold, the data (X) may be accumulated from storage of the storage provider into the log 516 of that storage bin. Once a threshold amount of cold data is accumulated within the log 516, the accumulated cold data may be sent to a target storage provider better suited for cold data. Compression, deduplication, encryption, data formatting (e.g., storing data blocks into a storage object), and/or other storage operations may be performed upon the accumulated cold data before being sent to the target storage provider.

Figure 5B:
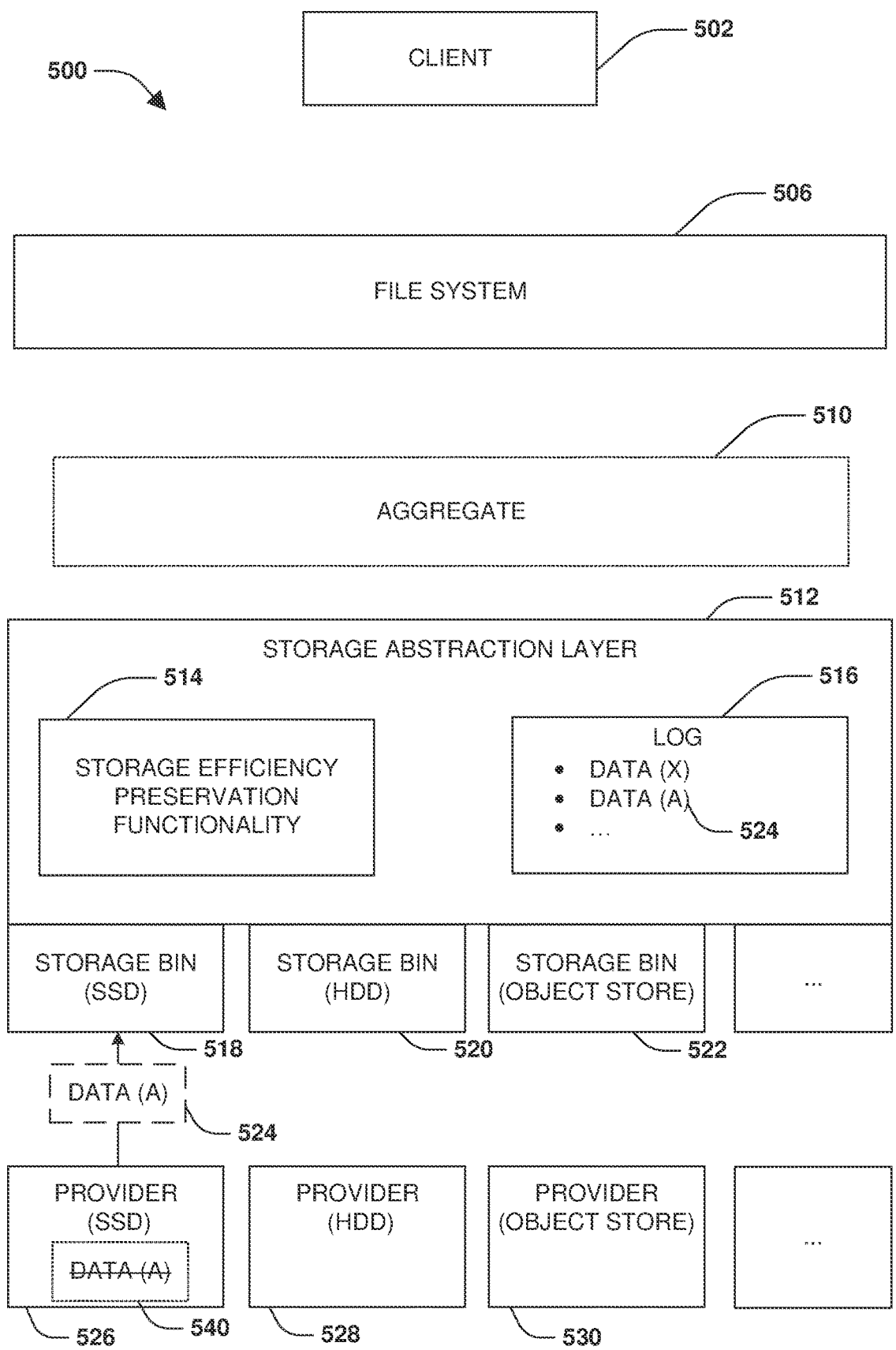
FIG. 5B is a component block diagram illustrating an exemplary computing device for providing a storage abstraction layer for a composite aggregate architecture, where data is accumulated into a log.

FIG. 5B illustrates the storage abstraction layer 512 determining that a frequency of access to the data (A) 524 within the solid state drive storage of the solid state drive storage provider 526 has fallen below a threshold set by the solid state drive storage bin 518 for the solid state drive storage provider 526. Accordingly, a storage location at which the data (A) 524 is stored within the solid state drive storage may be designated 540 (e.g., by the solid state drive storage bin 518) for garbage collection to later be freed so that new data can be stored within the storage location. The data (A) 524 may be extracted from the solid state drive storage by the solid state drive storage bin 518 and accumulated into the log 516 maintained by the solid state drive storage bin 518. In this way, cold data managed by the solid state drive storage bin 518 is accumulated into the log 516. It may be appreciated that any type of data may be accumulated into a log for migration of such data from a particular storage provider to a different storage provider (e.g., cold data, hot data, user data, metadata, randomly accessed data, redundant data, etc.).

Figure 5C:
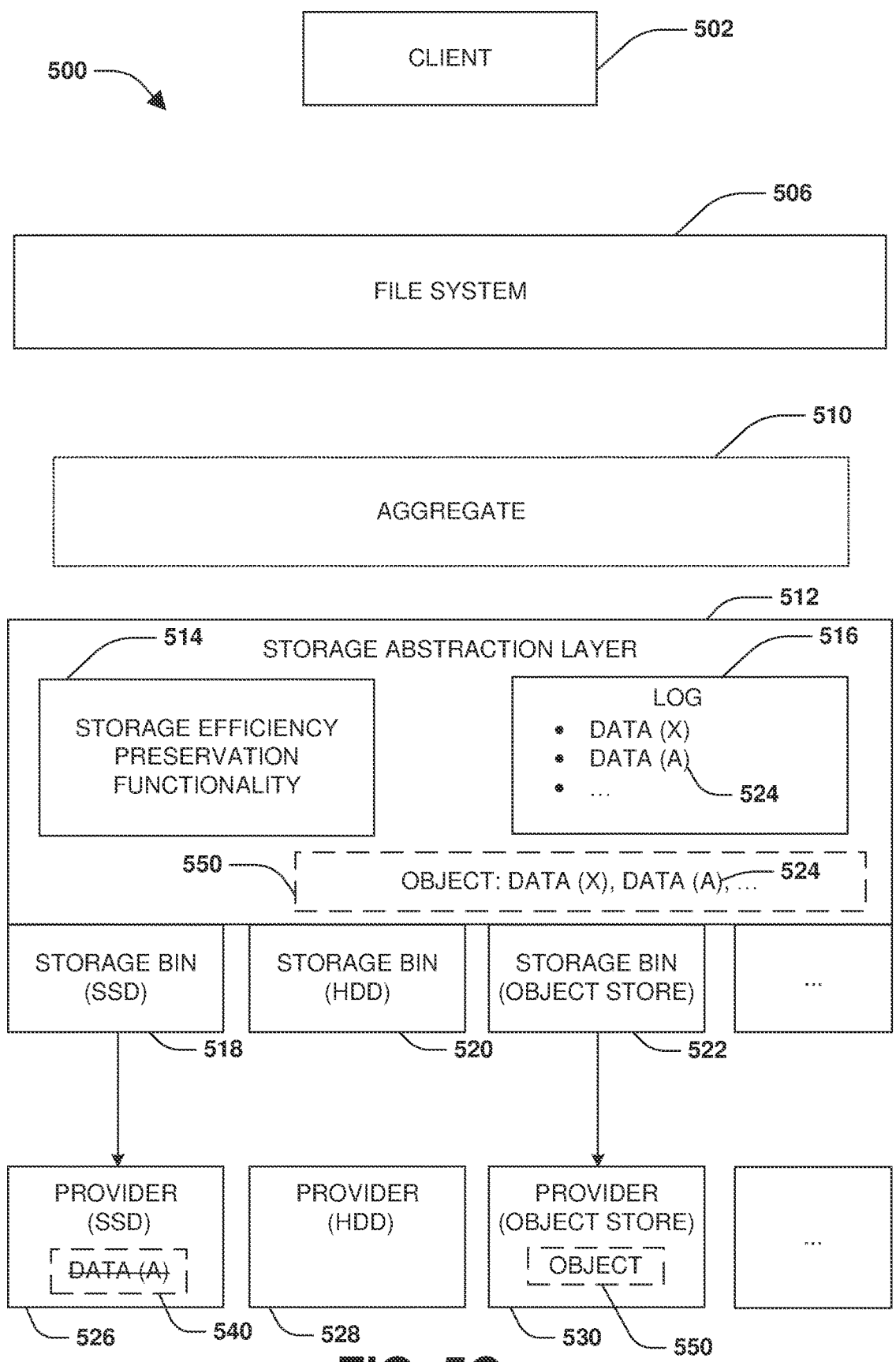
FIG. 5C is a component block diagram illustrating an exemplary computing device for providing a storage abstraction layer for a composite aggregate architecture, where accumulated data within a log is used to generate a storage object that is sent to a storage provider for storage.

FIG. 5C illustrates the storage abstraction layer 512, such as the solid state drive storage bin 518, determining that a threshold amount of data (e.g., cold data) has been accumulated into the log 516. Accordingly, a storage object 550 (e.g., a file, a blob, a range of blocks, a data structure, a data container, an object, etc.) may be generated to comprise the data (X), the data (A) 524, and/or other data that was accumulated into the log 516. Before generating the storage object 550, the storage abstraction layer 512 may format the data (e.g., the data may be formatted into a type of storage object used by the object storage provider 530 for storing data), deduplicate the data, encrypt the data, compress the data, etc. In this way, the storage object 550 is a single data container into which multiple related or unrelated data may be stored (e.g., the data (X) may be metadata and the data (A) 524 may be part of a client file).

The object storage bin 522 may send the storage object 550 to the object storage provider 530 that stores the storage object 550 within object storage provided by the object storage provider 530 and managed by the object storage bin 522. The object storage bin 552 may populate an object metafile with an object identifier of the storage object 550 and offsets of data stored into the storage object 550.

Figure 5D:
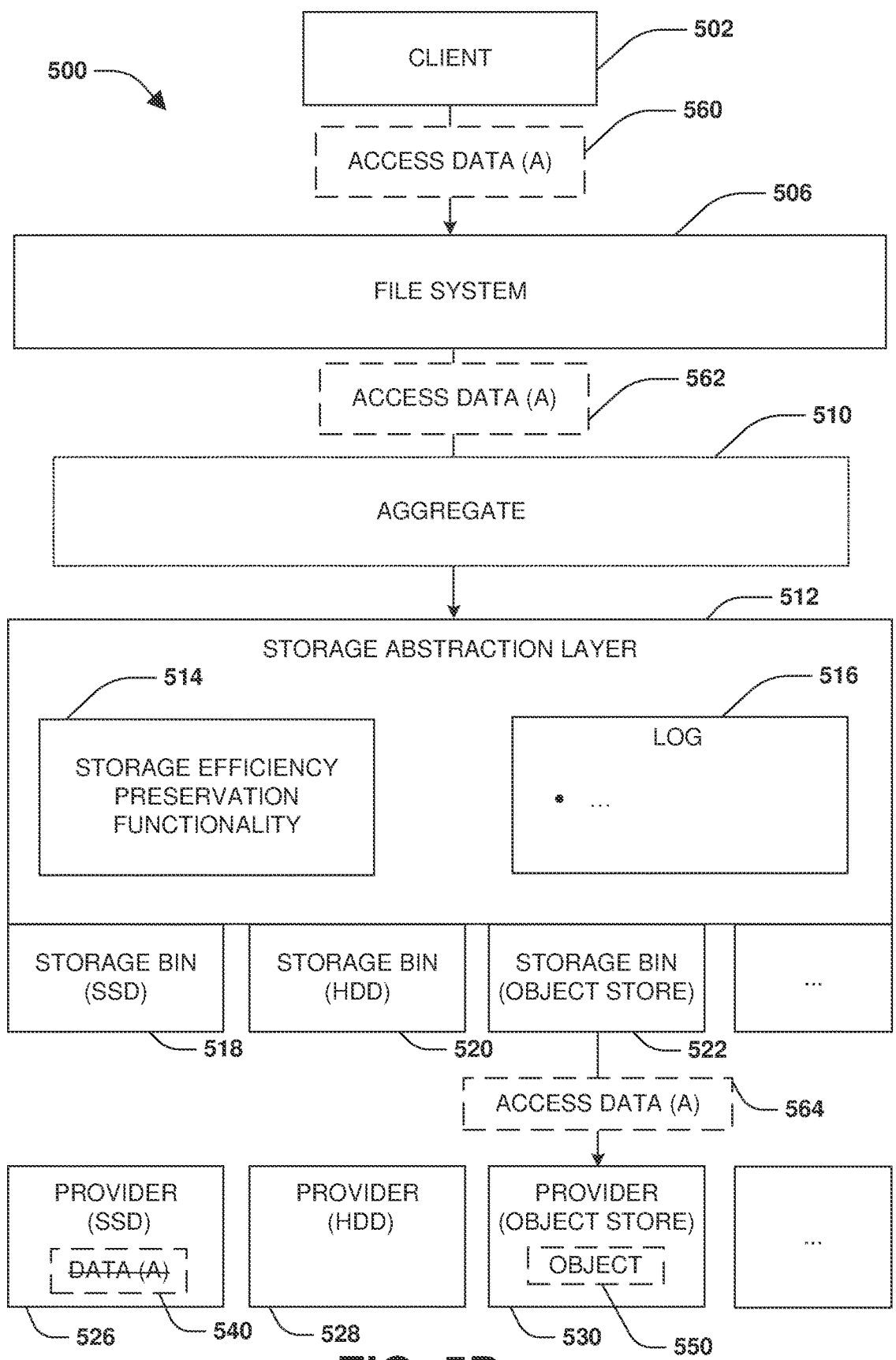
FIG. 5D is a component block diagram illustrating an exemplary computing device for providing a storage abstraction layer for a composite aggregate architecture, where data is accessed within a storage object.

FIG. 5D illustrates the client 502 submitting an access request 560 to the file system 506 for accessing the data (A) 560. In one example, the client 502 and/or the file system 506 are unaware of the location of the data (A) 524 (e.g., the file system 506 is merely aware of the notion of the storage aggregate 510 as a single data container). Accordingly, the file system 506 submits an access operation 562 to the storage aggregate 510, which is intercepted by the storage abstraction layer 512. In an example, the client 502 and/or the file system 506 may address the data (A) 524 by a physical volume block number or any other identifier (e.g., a file identifier, a virtual block number, etc.).

The storage abstraction layer 512 determines that the data (A) 524 is currently managed by the object storage bin 522 and is stored within object storage of the object storage provider 530. Accordingly, the object storage bin 522 may query the object metafile using the physical volume block number to identify the object identifier of the storage object 550 and an offset of the data (A) 524 within the storage object 550. The object identifier and the offset may be used by the object storage bin 522 to provide access 564 to the data (A) 524 within the storage object 550 stored within the object storage by the object storage provider 530.

Figure 5E:
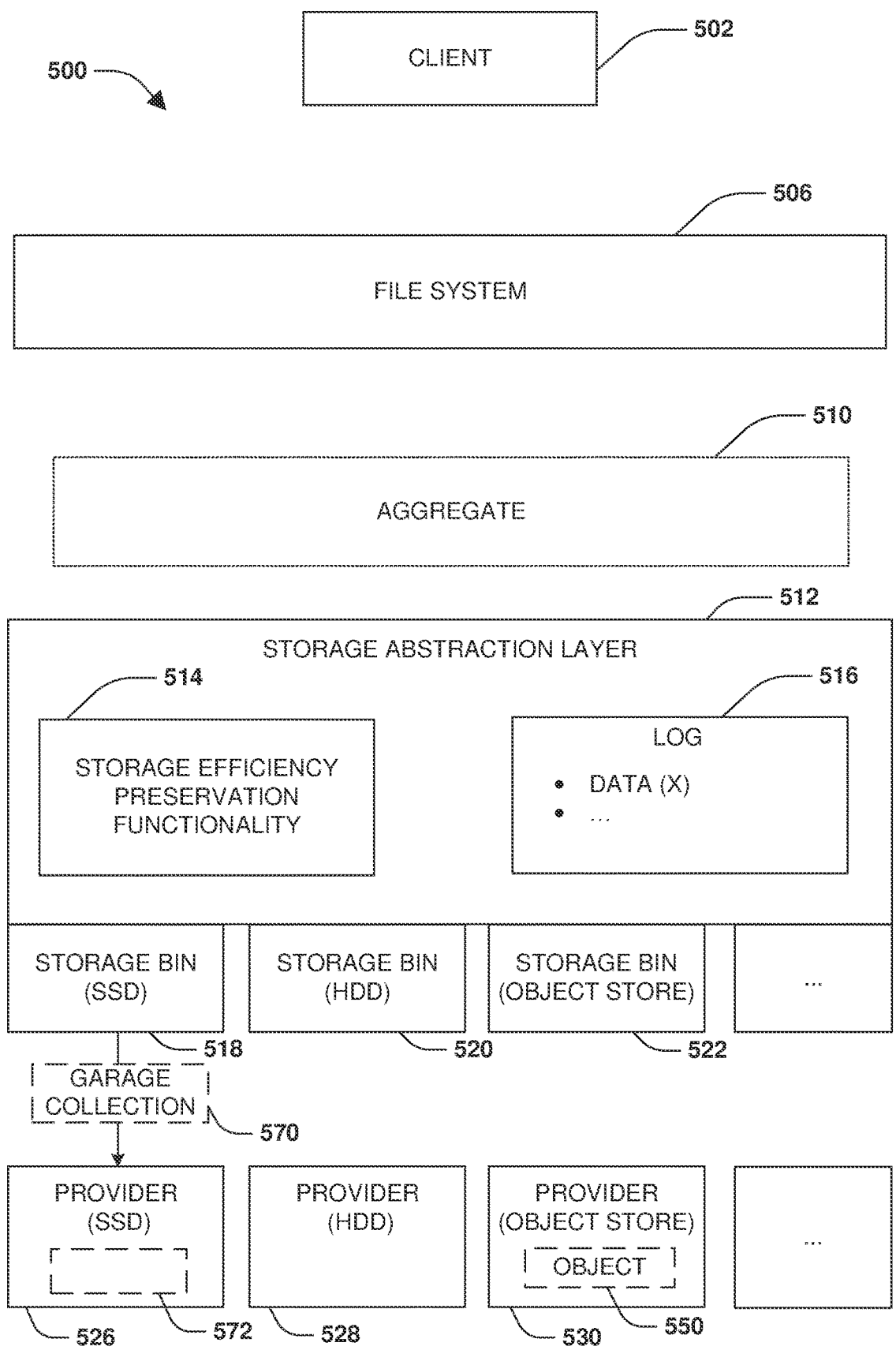
FIG. 5E is a component block diagram illustrating an exemplary computing device for providing a storage abstraction layer for a composite aggregate architecture, where garbage collection is performed.

FIG. 5E illustrates the solid state drive storage bin 518 performing garbage collection 570 upon the solid state drive storage of the solid state drive storage provider 526 (e.g., independent of any garbage collection and/or reference count tracking provided by the file system 506 and/or the solid state drive storage provider 526). Accordingly, the solid state drive storage bin 518 may free 572 the storage location designated 540 for garbage collection (e.g., the old/stale location of the data (A) 524).

Figure 6:
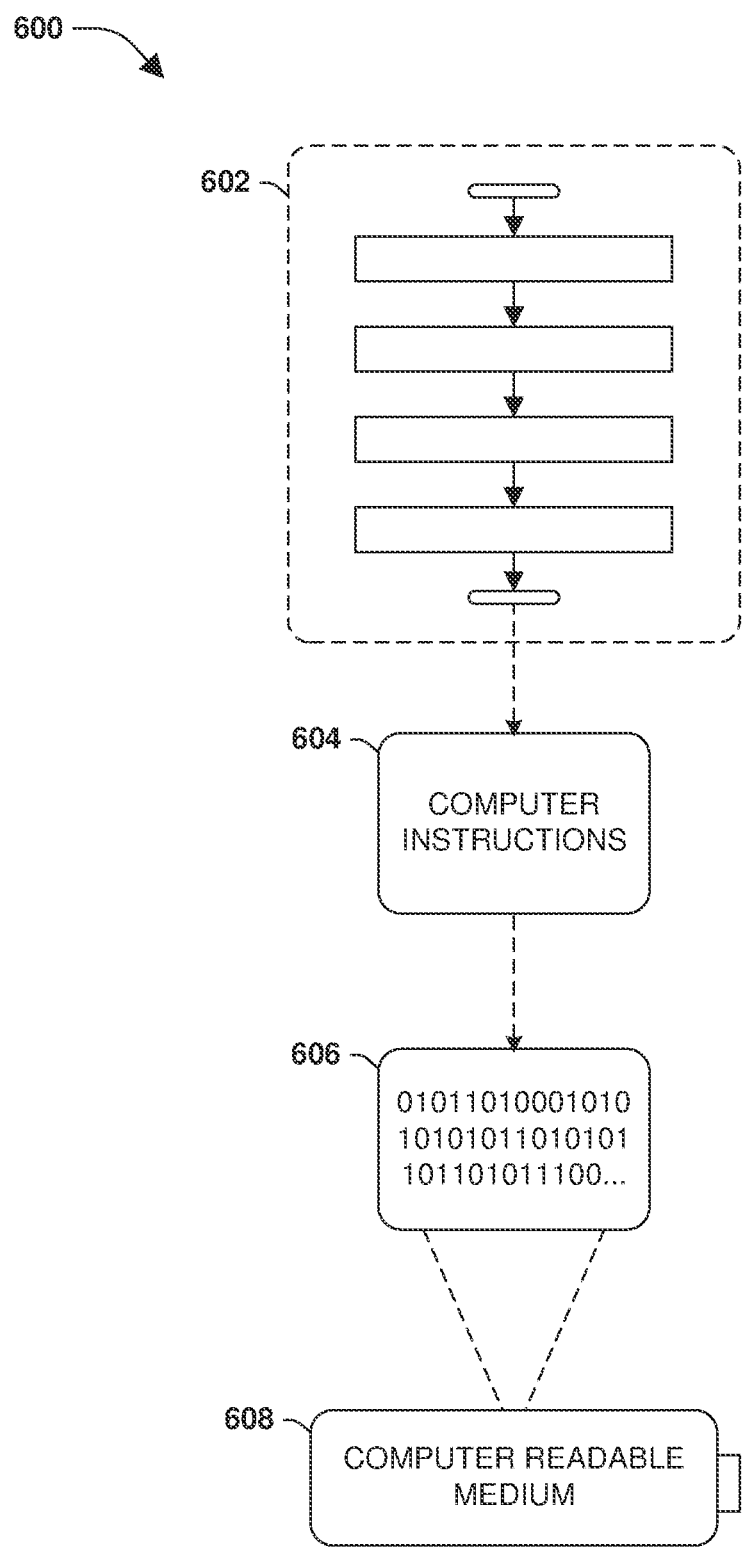
FIG. 6 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a compact disc-recordable (CD-R), a digital versatile disc-recordable (DVD-R), flash drive, a platter of a hard disk drive, etc., on which is encoded computer-readable data 606. This computer-readable data 606, such as binary data comprising at least one of a zero or a one, in turn comprises a processor-executable computer instructions 604 configured to operate according to one or more of the principles set forth herein. In some embodiments, the processor-executable computer instructions 604 are configured to perform a method 602, such as at least some of the exemplary method 300 of FIG. 3, for example. In some embodiments, the processor-executable computer instructions 604 are configured to implement a system, such as at least some of the exemplary system 400 of FIG. 4 and/or at least some of the exemplary system 500 of FIG. 5A-5E, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   intercepting, by a storage abstraction layer, a write request to write data to an aggregate;
   storing the data into first storage of a first storage provider based upon characteristics of the data corresponding to characteristics of the first storage provider;
   monitoring access to the data stored through the first storage provider within the first storage;
   in response to the data being accessed according to a first access type, accumulating the data into a first log for migration to a second storage provider; and
   in response to the data being accessed according to a second access type, accumulating the data into a second log for migration to a third storage provider, wherein the first log is maintained for the second storage provider and the second log is separately maintained for the third storage provider.

2. The method of claim 1, comprising:
   in response to the first log accumulating a threshold amount of data from different files, directories, and applications storing the data through the first storage provider, generating a storage object to include the data accumulated into the first log; and
   storing the storage object into storage hosted by the second storage provider.

3. The method of claim 2, comprising:
   creating an object metafile to track the storage object into which the data from the first log is stored; and
   populating the object metafile with an entry indicating that the data, from the first log of the first storage provider, is stored within the storage object.

4. The method of claim 1, comprising:
   in response to the second log accumulating a threshold amount of data, generating a container having a block based data format to include the data within the second log; and
   storing the container within a destination storage provider that supports the blocked based data format.

5. The method of claim 1, comprising:
   maintaining a plurality of logs, wherein each log of the plurality of logs is configured to accumulate a particular type of data;
   storing sequentially accessed data into the first log; and
   storing randomly accessed data into a second log.

6. The method of claim 1, comprising:
creating an object metafile to track the storage object into which the data from the first log is stored;
populating the object metafile with an entry indicating that the data, from the first log of the first storage provider, is stored within the storage object;
receiving a request for a file stored from the first log into the storage object;
querying the object metafile using a physical volume block number specified by the request to determine that the file is stored into the storage object; and
providing access to the file through the storage object.

7. The method of claim 1, comprising:
receiving a request for a file stored from the first log into a storage object hosted by the second storage provider;
querying the object metafile using a physical volume block number specified by the request to determine that the file is stored into the storage object; and
providing access to the file through the storage object.

8. A computing device, comprising:
a memory comprising machine executable code; and
a processor coupled to the memory, the processor configured to execute the machine executable code to cause the computing device to:
intercept, by a storage abstraction layer, a write request to write data to an aggregate;
store the data into first storage of a first storage provider based upon characteristics of the data corresponding to characteristics of the first storage provider;
monitor access to the data stored through the first storage provider within the first storage;
in response to the data being accessed according to a first access type, accumulate the data into a first log for migration to a second storage provider; and
in response to the data being accessed according to a second access type, accumulate the data into a second log for migration to a third storage provider, wherein the first log is maintained for the second storage provider and the second log is separately maintained for the third storage provider.

9. The computing device of claim 8, wherein the machine executable code causes the computing device to:
in response to the first log accumulating a threshold amount of data, generate a storage object; and
store the storage object into storage hosted by the second storage provider.

10. The computing device of claim 8, wherein the machine executable code causes the computing device to:
track, by the storage abstraction layer, reference counts of references to data stored within storage of the storage provider;
implement, by the storage abstraction layer, garbage collection for individual storage of each storage provider without adhering to how a file system tracks reference counts for the aggregate.

11. The computing device of claim 8, wherein the machine executable code causes the computing device to:
create a storage bin to manage the first storage provider;
use the storage bin to mark data stored by the first storage provider for garbage collection; and
perform the garbage collection, utilizing the storage bin to identify data marked for garbage collection, transparent to a file system managing the aggregate.

12. The computing device of claim 8, wherein the machine executable code causes the computing device to:
maintain a plurality of logs, wherein each log of the plurality of logs is configured to accumulate a particular type of data;
create storage bins for a plurality of storage providers whose data is accumulated into the plurality of logs;
utilize the storage bins to set thresholds for the plurality of storage providers to identify the type of data to accumulate into the plurality of logs.

13. The computing device of claim 8, wherein the machine executable code causes the computing device to:
create a plurality of storage bins to individually manage where and how to store and access data of different storage providers; and
create the aggregate as a container to store the data of the different storage providers using the plurality of storage bins.

14. The computing device of claim 13, wherein the machine executable code causes the computing device to:
abstract away, by the storage abstraction layer using the plurality of storage bins, how the data of the aggregate is stored across the different storage providers.

15. A non-transitory machine readable medium comprising instructions for performing a method, which when executed by a machine, causes the machine to:
intercept a write request to write data to an aggregate;
store the data into first storage of a first storage provider based upon characteristics of the data corresponding to characteristics of the first storage provider;
monitor access to the data stored through the first storage provider within the first storage;
in response to the data being accessed according to a first access type, accumulate the data into a first log for migration to a second storage provider; and
in response to the data being accessed according to a second access type, accumulate the data into a second log for migration to a third storage provider, wherein the first log is maintained for the second storage provider and the second log is separately maintained for the third storage provider.

16. The non-transitory machine readable medium of claim 15, wherein the instructions cause the machine to:
in response to the first log accumulating a threshold amount of data, generate a storage object; and
store the storage object into storage hosted by the second storage provider.

17. The non-transitory machine readable medium of claim 15, wherein the instructions cause the machine to:
in response to the second log accumulating a threshold amount of data, generate a storage object to include the data within the second log.

18. The non-transitory machine readable medium of claim 17, wherein the instructions cause the machine to:
create a plurality of storage bins to individually manage where and how to store and access data of different storage providers; and
create the aggregate as a container to store the data of the different storage providers using the plurality of storage bins.

19. The non-transitory machine readable medium of claim 15, wherein the instructions cause the machine to:
exposing a subset of characteristics of the storage providers to a file system.

20. The non-transitory machine readable medium of claim 19, wherein the instructions cause the machine to:
track, by a storage abstraction layer, reference counts of references to data stored within storage of the storage provider;

implement, by the storage abstraction layer, garbage collection for individual storage of each storage provider without adhering to how a file system tracks reference counts for the aggregate.

\* \* \* \* \*